Dec. 25, 1928.
R. HANSEN
1,696,843
BAG INSERTER
Filed Sept. 29, 1924   3 Sheets-Sheet 1
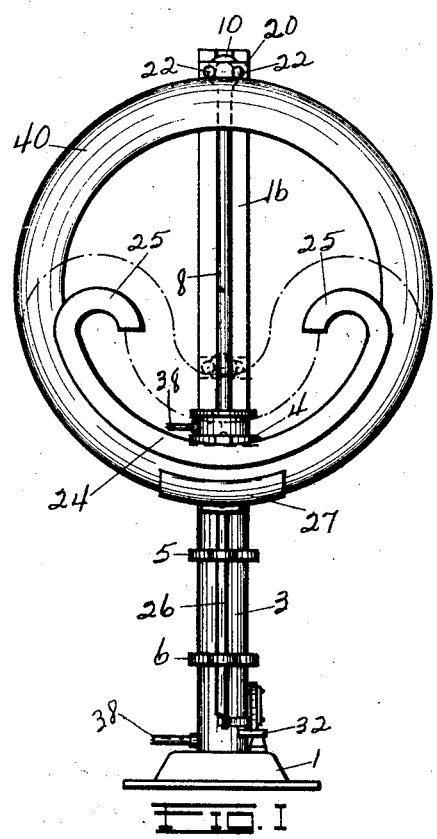
FIG. I
Raymond Hansen
Inventor
By Robert O. Harvey
Attorney

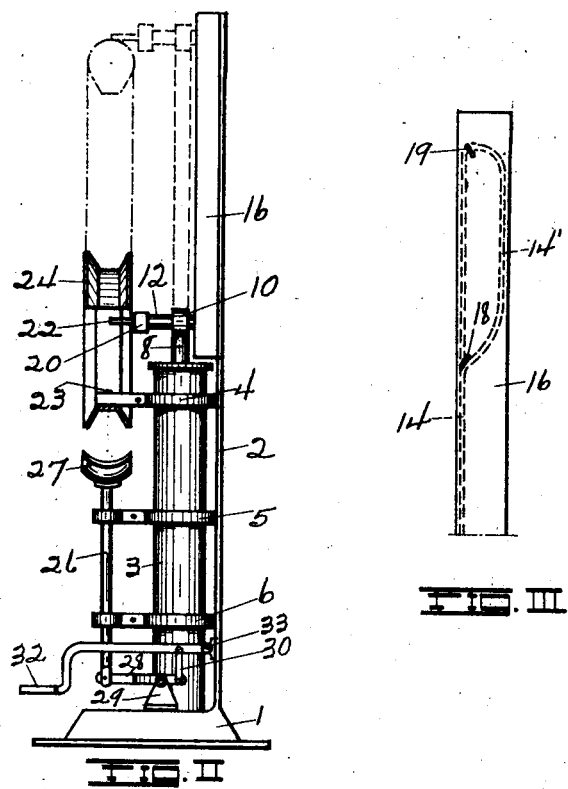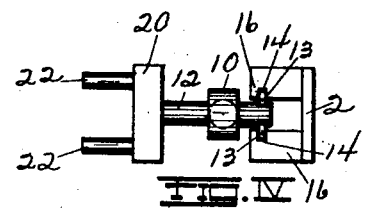

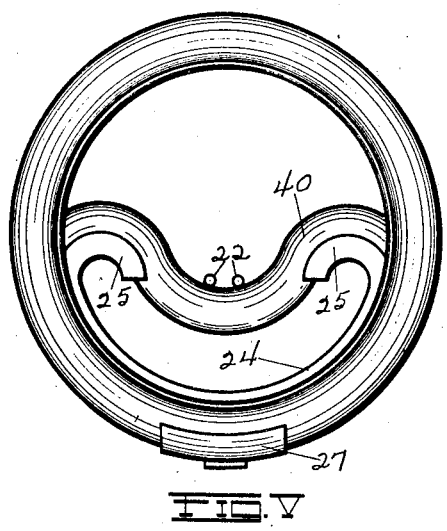
FIG. V
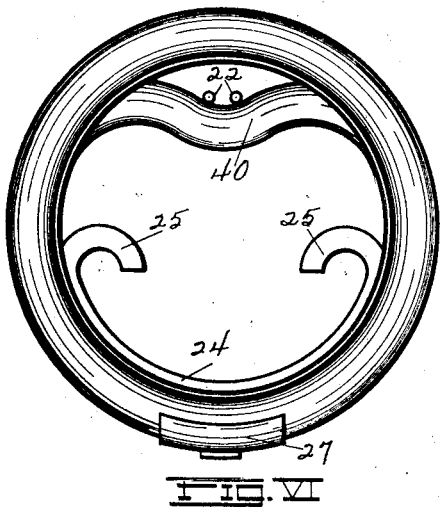
FIG. VI

Patented Dec. 25, 1928.

1,696,843

UNITED STATES PATENT OFFICE.

RAYMOND HANSEN, OF CUDAHY, WISCONSIN, ASSIGNOR TO THE FISK RUBBER COMPANY, OF CHICOPEE FALLS, MASSACHUSETTS, A CORPORATION OF MASSACHUSETTS.

BAG INSERTER.

Application filed September 29, 1924. Serial No. 740,523.

My invention relates to the manufacture of pneumatic tires and more particularly to a device for inserting the expansible cores or so-called bags in the raw casing.

It is customary to cure or vulcanize the tire casing while supported on an expansible core or bag. Such bags are generally formed mainly of rubber and are placed in the tire casing after the latter has been completely formed. The bag while flexible is relatively heavy and the insertion of the bag into the casing by hand is a laborious and time consuming operation. It is an object of my invention to provide a machine which will perform this operation in an accurate and expeditious manner. Other and further objects wil be apparent from the following specification and claims.

In the accompanying drawings which illustrate one embodiment of my invention,

Figure 1 is a front elevation,

Figure 2 is a side elevation,

Figure 3 is a detail of the cam track controlling the folding pin, and

Figure 4 is a detail showing the folding pins in plan view.

Figures 5 and 6 show steps in the operation.

Referring to the drawings, 1 designates the base which supports a vertical standard 2, and air cylinder 3, the latter being secured to the standard 2 by brackets 4, 5, and 6. A piston rod 9 operates in cylinder 3 and is provided at its upper end with a head 10 in which a short horizontal rod 12 is slidably mounted. The rearward end of rod 12 is provided with projecting pins 13 which ride in cam grooves 14 formed in blocks 16 secured to standard 2. The grooves 14, see Figure 3 is provided with spring switches 18 so that as piston rod 8 reaches a predetermined point in its upward travel the switches 18 will guide pins 13 into the position 14' of the cam grooves thus retracting rod 12. The cam grooves are formed to return rod 12 to its outward position as the piston rod 8 reaches the upper end of its stroke and pins 13 return along the vertical positions of the grooves, thus maintaining the rod 12 in extended position on the downward stroke of piston rod. If desired a second switch 19 may be inserted in the cam grooves to assure the return of the pins 13 along the vertical portion. The forward end of rod 12 is provided with a block 20 rigidly secured thereto and carrying two spaced pins 22.

Secured to the outer end of bracket 4 at 23 is curved support 24, substantially V-shaped in cross section to conform to the inner periphery of a bag as shown in Figure 2. The ends of member 24 are curved inwardly to form bending fulcrums 25.

The brackets 5 and 6 are extended to form guides for a vertical rod 26 provided at its upper end with a clamping member 27. The lower end of rod 26 is connected to one end of a lever 28 pivoted to member 29 secured to base 1, the other end of lever 28 being connected by a link 30 to foot lever 32 pivoted to standard 2 at 33. The weight of the clamp and rod 26 normally retain the clamp in lowered position.

Compressed air is admitted above and below the piston in cylinder 3 through piping 38 controlled by suitable valves not shown. The cylinder 3 and its air connections may be of any conventional type and it is not thought necessary to describe the main detail.

The operation of my device is as follows. With pins 22 in elevated position a bag 40 is placed in channel member 24 and held in position by clamp 27, as shown in Figure 1, pins 22 engaging the top of the bag. Air is now admitted to the upper side of the piston in cylinder 3 thus moving pins 22 downwardly. The pins 22 in their descent bend the bag inwardly about fulcrums 25 as shown in dotted line in Figure 1. The foot lever is now released, thus lowering clamp 27, and a raw tire casing slipped onto the lower portion of the bag and held in position by clamp 27, as shown in Figure 5. The air in cylinder 3 is now reversed moving pins 22 upwardly and permitting the bag which is formed of resilient material to return to its original shape, entering the tire casing as it does so. As the plunger 8 approaches the upper point of its movement pins 13 move into cam groove 14' thus retracting the pins 22 which disengage the top of the bag permitting the latter to enter the casing. Figure 6 shows the pins 22 at the point of complete withdrawal and the bag enclosed in the tire casing with the exception of the part still engaged by pin 22.

It will be understood that the specific form of my invention above described is illustrative only and that my invention is not limited thereto.

I claim:

1. A device of the character described comprising means to engage not more than half of the inner periphery of a bag and means to fold the unengaged portion of the bag inwardly toward the engaged portion.

2. A device of the character described comprising means to engage not more than half of the inner periphery of a bag, and means operating substantially in the plane of the bag to fold the free portion thereof towards the engaged portion.

3. A device of the character described comprising means to engage not more than half of the inner periphery of a bag and means operating substantially in the plane of the bag to fold the free portion thereof towards the engaged portion and beyond the center of the bag.

4. A device of the character described comprising an arcuate channeled member with inturned ends the arcuate portion adapted to engage the inner periphery of a bag, reciprocating means engaging the outer periphery of the bag at a point substantially opposite the arcuate support and adapted in the first half of its movement to force the bag between and around the inturned ends of the support, and on its return stroke to release the bag.

5. A device of the character described comprising an arcuate support engaging not more than half of the interior periphery of a bag the ends of said support being curved to form fulcrums, spaced pins engaging the exterior periphery of the bag and positioned substantially opposite the arcuate support, means to move the pins in the plain of the air bag to fold the latter between the fulcrums, means to position a tire casing over that portion of the bag on the arcuate support, means to return the pins to their original position and means to withdraw the pins from contact with the bag as the pins approach the end of the latter movement.

6. A device of the character described comprising means to engage not more than half of the periphery of a bag and means operating substantially in the plain of the bag to fold the free portion thereof towards the engaged portion and beyond the center of the bag.

In testimony whereof I have signed my name to the above specification.

RAYMOND HANSEN.